(12) United States Patent  (10) Patent No.: US 7,214,018 B2
Lussier  (45) Date of Patent: May 8, 2007

(54) SLIDING BED ACCESSORY ARRANGEMENT (75) Inventor: Paul B. Lussier, Royal Oak, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/094,507

(22) Filed: Mar. 31, 2005

(65) Prior Publication Data
US 2006/0222471 A1 Oct. 5, 2006

(51) Int. Cl.
B61D 45/00 (2006.01)
(52) U.S. Cl. ..................................... 410/130
(58) Field of Classification Search ............... 410/130, 410/129, 143, 150, 117, 118, 31; 296/37.1, 296/37.6; 224/403, 404, 405
See application file for complete search history.

(56) References Cited

U.S. PATENT DOCUMENTS

| 4,507,033 | A | * | 3/1985 | Boyd | 410/104 |
|---|---|---|---|---|---|
| 4,635,992 | A | * | 1/1987 | Hamilton et al. | 296/37.6 |
| 5,037,153 | A | * | 8/1991 | Stark | 296/37.6 |
| 5,121,959 | A | * | 6/1992 | King | 296/37.6 |
| 5,520,316 | A | * | 5/1996 | Chen | 224/539 |
| 6,116,673 | A | * | 9/2000 | Clonan | 296/37.6 |
| 6,224,128 | B1 | * | 5/2001 | Mains | 296/37.6 |
| 6,390,527 | B1 | * | 5/2002 | Leftridge | 296/56 |
| 6,629,807 | B2 | | 10/2003 | Bernardo | |
| 6,722,541 | B1 | * | 4/2004 | Aftanas et al. | 224/403 |
| 6,971,828 | B2 | * | 12/2005 | Bernardo | 410/135 |
| 7,028,872 | B2 | * | 4/2006 | Lobanoff | 224/497 |
| 2002/0048495 | A1 | | 4/2002 | Anderson et al. | |
| 2003/0082023 | A1 | * | 5/2003 | Bernardo | 410/129 |
| 2004/0047703 | A1 | | 3/2004 | Bernardo | |
| 2005/0152761 | A1 | * | 7/2005 | Silamianos et al. | 410/130 |
| 2006/0102669 | A1 | * | 5/2006 | Fouts et al. | 224/404 |

* cited by examiner

Primary Examiner—H Gutman
(74) Attorney, Agent, or Firm—Global IP Counselors (57) ABSTRACT A sliding bed accessory arrangement is provided with a sliding bed accessory, such as a bed divider, that is configured to slide between and retained in several different positions within a vehicle cargo bed. The sliding bed accessory arrangement has a pair of tracks fixedly attached to opposite sides of a vehicle cargo area with a pair of mounting arrangements slideably supporting the bed accessory in the tracks. The mounting arrangements are designed so that they can be installed into the rear ends of the tracks even when very little clearance is provided between the vehicle body and the rear open ends of the tracks.

16 Claims, 12 Drawing Sheets

SLIDING BED ACCESSORY ARRANGEMENT

BACKGROUND OF THE INVENTION

1. Field of the Invention

The present invention generally relates to a sliding bed accessory arrangement for a vehicle cargo area. More specifically, the present invention relates to a sliding bed accessory, such as a pick-up truck bed divider, which can be retained in several different positions within a pick-up truck cargo area.

2. Background Information

Pick-up trucks have increased in popularity in recent years. Some pick-up trucks are used primarily for work and others primarily for recreation. Many trucks do double-duty supporting both of these spheres of activity. Basically a pick-up truck has a storage bed in which a tailgate is pivotally mounted to side support portions of the storage bed. The explosion in the popularity of pick-up trucks and/or sport utility trucks (SUTs) has fueled a proliferation of new body configurations. Trucks are offered as standard cabs, king cabs, crew cabs, and the like. Likewise, truck interiors have been adapted to meet the needs for more comfort, more passenger capacity, and the like.

Recently, the cargo area of the pick-up truck has undergo a similar evolution. Typically, a standard full-sized pick-up bed is little more than a large empty volume with a few tie-down points scattered along the perimeter of its interior walls or along a bed rail. Generally speaking, bed usage may be grouped into three broad categories: hauling, securing, and separating items in the payload. Most truck users need to perform each of these tasks with some frequency. Yet the demands placed on the bed for hauling are significantly different from those needed to secure or separate items in and around the bed. Thus, various bed accessories have been offered to allow customization of the bed to suit a particular need.

For example, some automobile manufacturers have made track systems in which a variety of bed accessories can be easily attached. Some of the bed accessories that are currently available on the market include a bed divider, a bed extender and a tray or box. Currently, pick-up trucks are available with a track system such as the one disclosed in U.S. Patent Publication No. 2002/0048495 to Anderson et al. Other examples of some sliding bed accessories are disclosed in the following U.S. publications: U.S. Pat. No. 6,629,807 to Bernardo; and U.S. Patent Publication No. 2004/0047703 to Bernardo. While many of these systems are at least partially effective, they are not necessarily designed to interface with the truck in an optimum manner from a functional, structural, and aesthetic standpoint.

In view of the above, it will be apparent to those skilled in the art from this disclosure that there exists a need for an improved sliding bed accessory arrangement. This invention addresses this need in the art as well as other needs, which will become apparent to those skilled in the art from this disclosure.

SUMMARY OF THE INVENTION

One object of the present invention is to provide a sliding bed accessory arrangement that is configured and arranged to slide easily among various position in a vehicle cargo area.

Another object of the present invention is to provide a sliding bed accessory arrangement that is configured and arranged to be installed in tracks in a non-longitudinal manner when the open ends of the tracks are substantially blocked.

In order to achieve the above object and other objects of the present invention, a sliding bed accessory arrangement is provided that basically comprises a vehicle cargo area, a first track, a second track, a first mounting arrangement, a second mounting arrangement and a bed accessory. The vehicle cargo area includes a bed floor, a front cargo wall disposed on a forward end of the bed floor, a first side cargo wall disposed on a first lateral side of the bed floor, and a second side cargo wall disposed on a second lateral side of the bed floor. The first roller track is fixedly attached to the first side cargo wall of the vehicle cargo area. The second roller track is fixedly attached to the second side cargo wall of the vehicle cargo area in a parallel, spaced arrangement relative to the first roller track. The first mounting arrangement includes a pair of first rolling members and a first locking mechanism. The first rolling members are rollably disposed in the first roller. The first locking mechanism has a first locking member slideably disposed in the first roller track and a first hand operating member operatively coupled to the first locking member to selectively move the first locking member between a first sliding position and a first locked position in which sliding of the first locking member is prevented. The second mounting arrangement includes a pair of second rolling members and a second locking mechanism. The second rolling members are rollably disposed in the second roller track. The second locking mechanism has a second locking member slideably disposed in the second roller track and a second hand operating member operatively coupled to the second locking member to selectively move the second locking member between a second sliding position and a second locked position in which sliding of the second locking member is prevented. The bed accessory has first and second side ends rigidly attached to the first and second mounting arrangements.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–4, a vehicle or pick-up truck 10 is illustrated that has a truck bed or vehicle cargo area 12 with a sliding bed accessory arrangement 14 in accordance with a first embodiment of the present invention. However, it will be apparent to those skilled in the art from this disclosure that the sliding bed accessory arrangement 14 of the present invention can be utilized in any of a variety of vehicles having a vehicle cargo area, such as vans and the like.

The vehicle cargo area 12 of the vehicle 10 basically has a bed floor 16, a front cargo wall 18, a pair of side cargo walls 21 and 22, and a rear tailgate 24. The front cargo wall 18 is disposed on a forward end of the bed floor 16 and interconnects the forward ends of the side cargo walls 21 and 22. The first side cargo wall 21 is disposed on a first lateral side of the bed floor 16, while the second side cargo wall 22 is disposed on a second lateral side of the bed floor 16. The tailgate 24 is pivotally coupled to the rearward ends of the side cargo walls 21 and 22. The vehicle cargo area 12 of the vehicle 10 is a relatively conventional structure that is well known in the art. Since vehicle cargo areas of pick-up trucks are well known in the art, the vehicle cargo area 12 will not be discussed or illustrated in detail herein.

Turning now to FIGS. 3–9, the sliding bed accessory arrangement 14 basically has a pair of roller tracks 32, a first mounting arrangement 33, a second mounting arrangement 34, and a sliding bed accessory or bed extender 35. It will be apparent to those skilled in the art from this disclosure that other sliding bed accessories can be mounted in accordance with the present invention. A first one of the tracks 32 is fixedly attached to the first side cargo wall 21 of the vehicle cargo area 12, while a second one of the tracks 32 is fixedly attached to the second side cargo wall 22 of the vehicle cargo area 12 in a parallel, spaced arrangement relative to the first one of the tracks. The sliding bed accessory or bed extender 35 is slideably supported on the roller tracks 32 by the first and second mounting arrangements 33 and 34.

As seen in FIGS. 2–5 and 8, both of the roller tracks 32 have generally transverse C-shaped cross sections that open towards each other. The roller tracks 32 are preferably constructed of a hard rigid material such as metal. The roller tracks 32 are structurally identical to each other, but mounted as mirror images of each other. The first and second mounting arrangements 33 and 34 are slideably mounted within the roller tracks 32, as explained below. Since the roller tracks 32 are structurally identical to each other, only one of the roller tracks 32 will be discussed and/or illustrated in detail.

As best seen in FIGS. 9–12, the roller track 32 has a mounting flange 32a, an upper track portion 32b, a lower track portion 32c, a rear wall portion 32d and a pair of retaining lips 32e. The roller track 32 is a channel shaped member with the retaining lips 32e being turned inwardly to define a longitudinal slot or opening 36. The roller tracks 32 are fixedly attached to the first and second side cargo walls 21 and 22 of the vehicle cargo area 12 by a plurality of fasteners 38.

Figure 6:
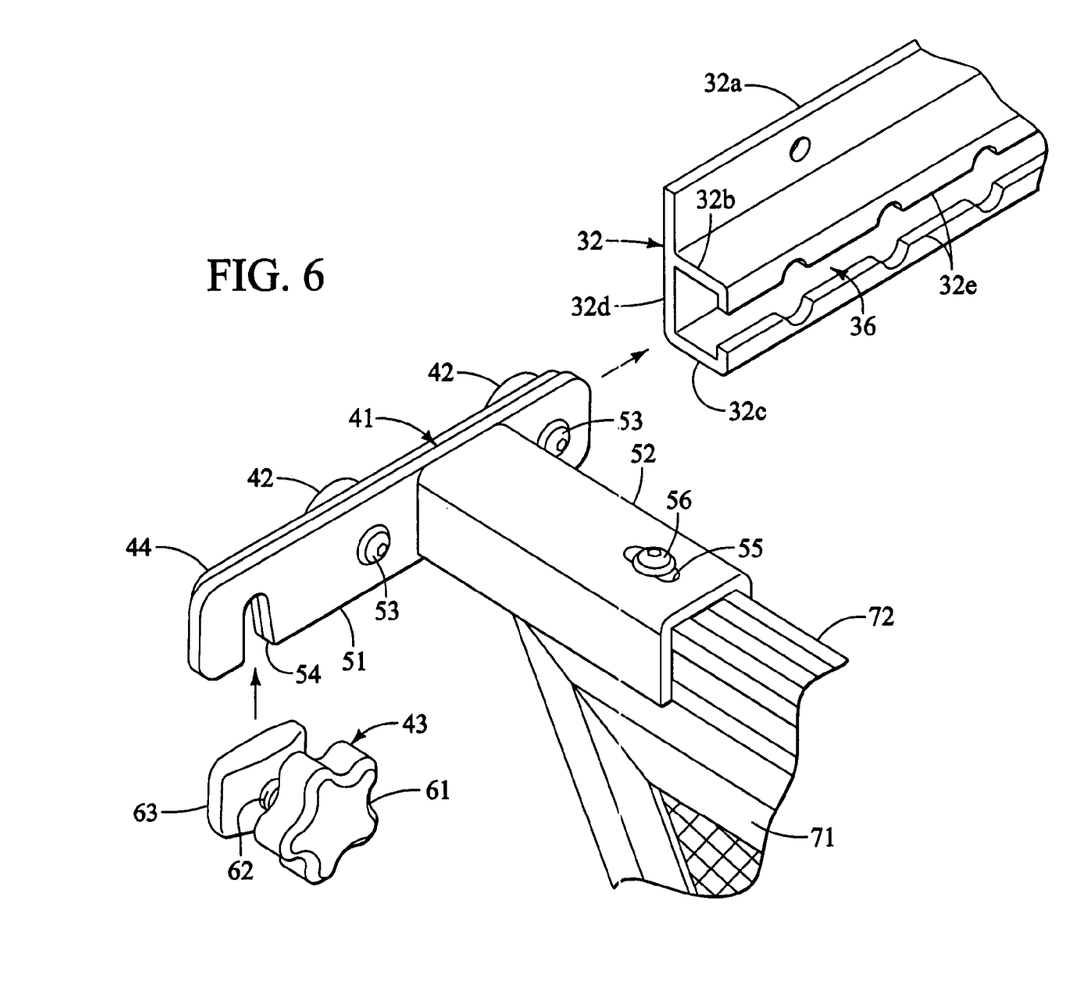
FIG. 6 is a transverse cross sectional view of the sliding bed accessory arrangement as viewed along section line 6—6 of FIG. 4 with the vehicle bed removed for clarity.
Figure 8:
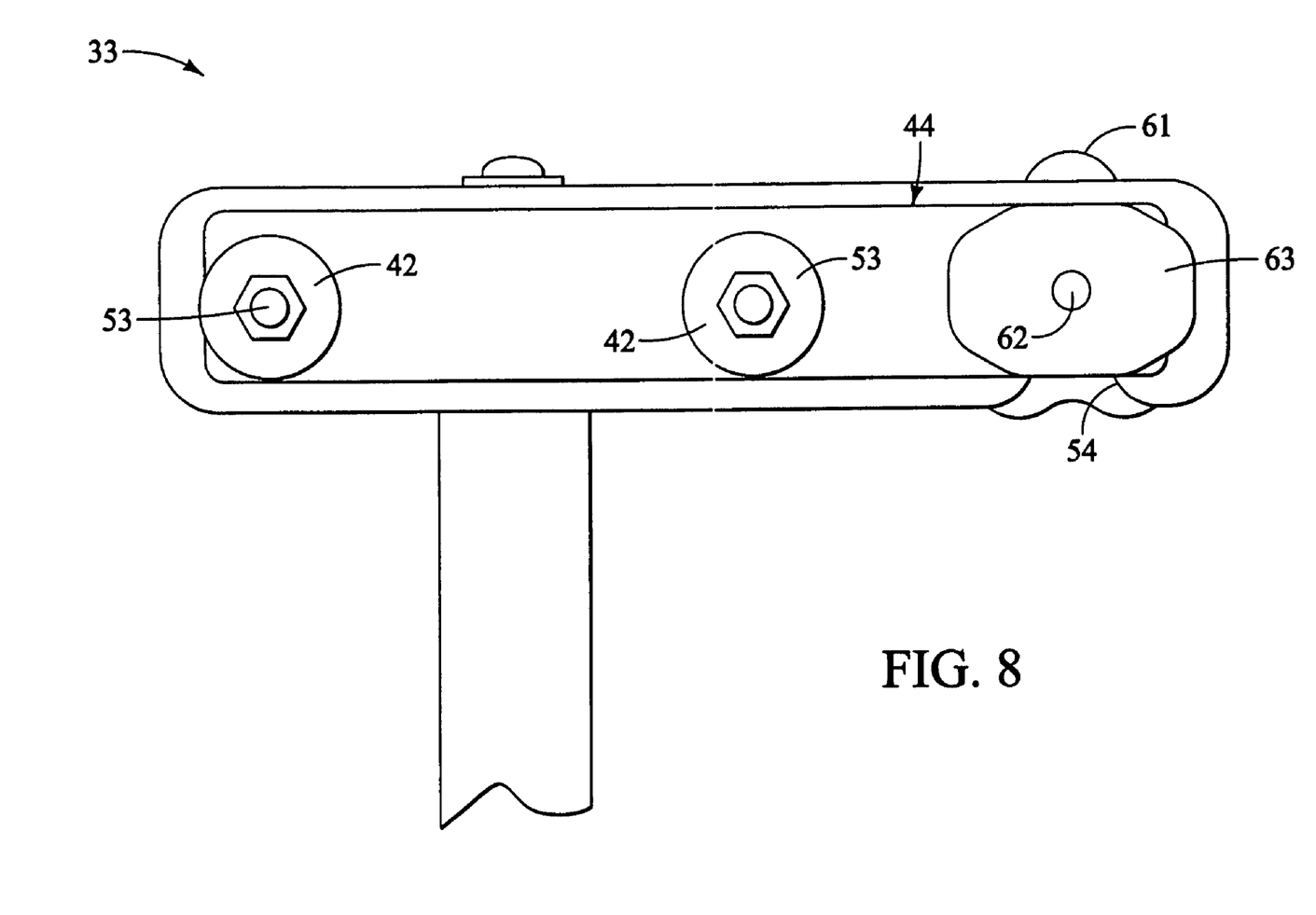
FIG. 8 is a partial cross sectional view of the sliding bed accessory arrangement as viewed along section line 8—8 of FIG. 6.
Figure 9:
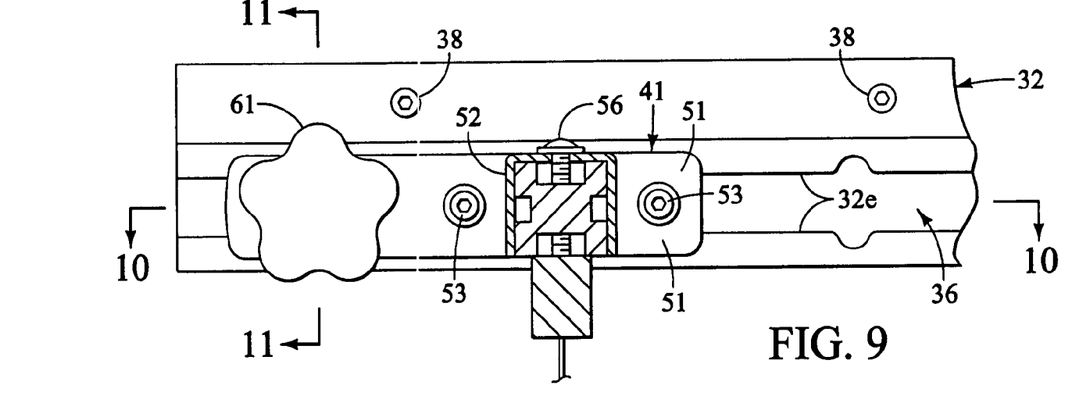
FIG. 9 is a partial cross sectional view of the sliding bed accessory arrangement as viewed along section line 9—9 of FIG. 7.
Figure 10:
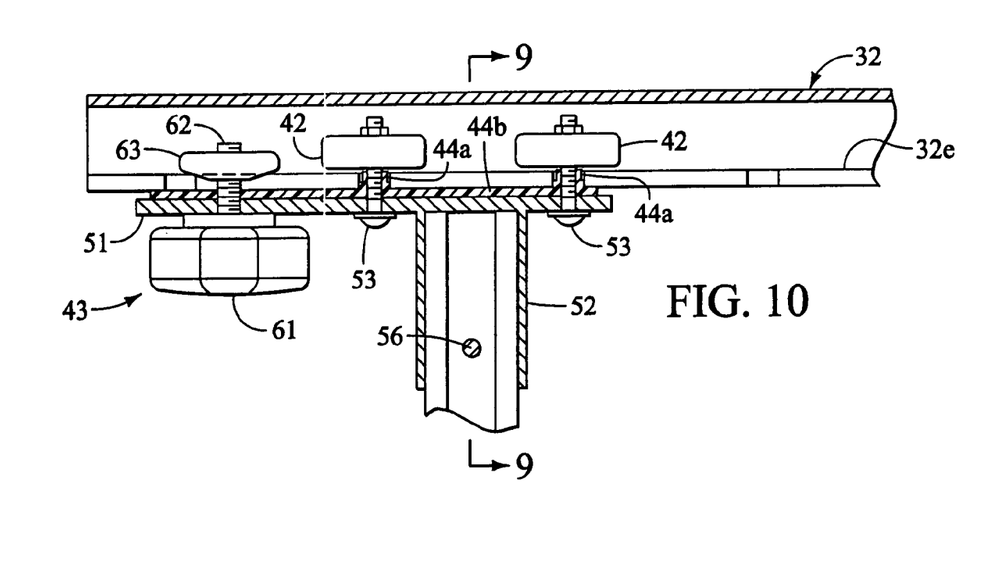
FIG. 10 is a partial perspective view of a portion of the cargo area showing an initial installation step of installing the mounting arrangements into the roller tracks in accordance with the present invention.
Figure 11:
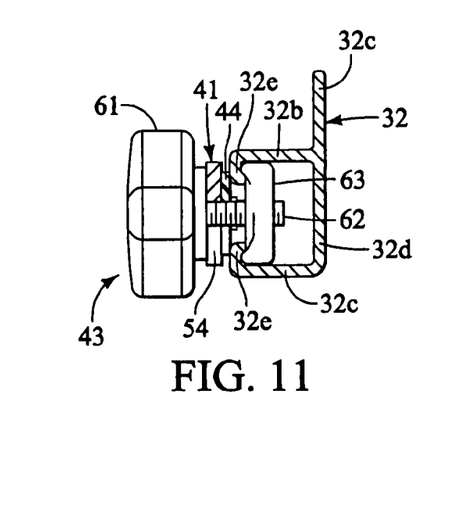
FIG. 11 is a partial perspective view of a portion of the cargo area showing a subsequent installation step from FIG. 10 for installing the mounting arrangements into the roller tracks in accordance with the present invention.

Referring back to FIGS. 2 and 3 and to FIGS. 6 and 8, in this particular vehicle 10, the roller tracks 32 extend substantially the entire lengths of the first and second side cargo walls 21 and 22 of the vehicle cargo area 12. The roller tracks 32 have rear open ends located near rearward end abutments (taillight housing) of the first side cargo wall 21 and front open ends located near from the front cargo wall 18. The rearward end abutments of the cargo walls 21 and 22 are arranged so that the rear open ends of the roller tracks 32 are at least partial blocked, which prevents the mounting arrangements 33 and 34 from being installed longitudinally into the rear open ends of the roller tracks 32. Moreover, the spacings between the front open ends of the roller tracks 32 and the front cargo wall 18 are too close to each other so that the mounting arrangements 33 and 34 can not be installed longitudinally into the front open ends of the roller tracks 32.

Figure 7:
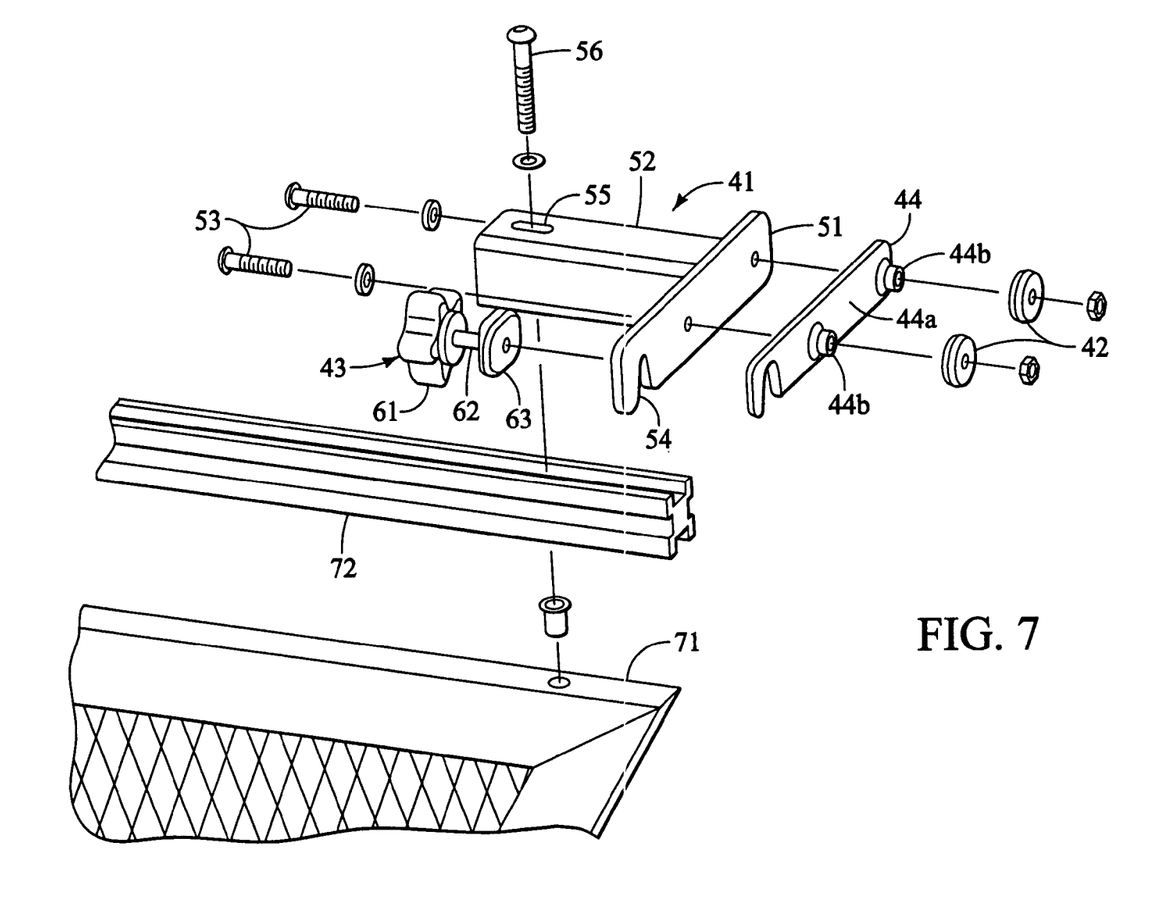
FIG. 7 is a partial cross sectional view of the sliding bed accessory arrangement as viewed along section line 7—7 of FIG. 6 with the vehicle bed removed for clarity.

Basically, as seen in FIGS. 6–8, the first mounting arrangement 33 basically includes a mounting bracket 41, a pair of rollers or wheels 42, a locking mechanism 43, and a sliding member 44. The second mounting arrangement 34 has generally the same construction as the first mounting arrangement 33. In particular, the first and second mounting arrangements 33 and 34 are constructed of the identical parts, except for the mounting brackets 41, which are mirror images of each other. Thus, the identical parts of the first and second mounting arrangements 33 and 34 will be given the same reference numbers. Moreover, it will be apparent from this disclosure that the descriptions and illustrations of the first mounting arrangement 33 apply to the second mounting arrangement 34.

Figure 1:
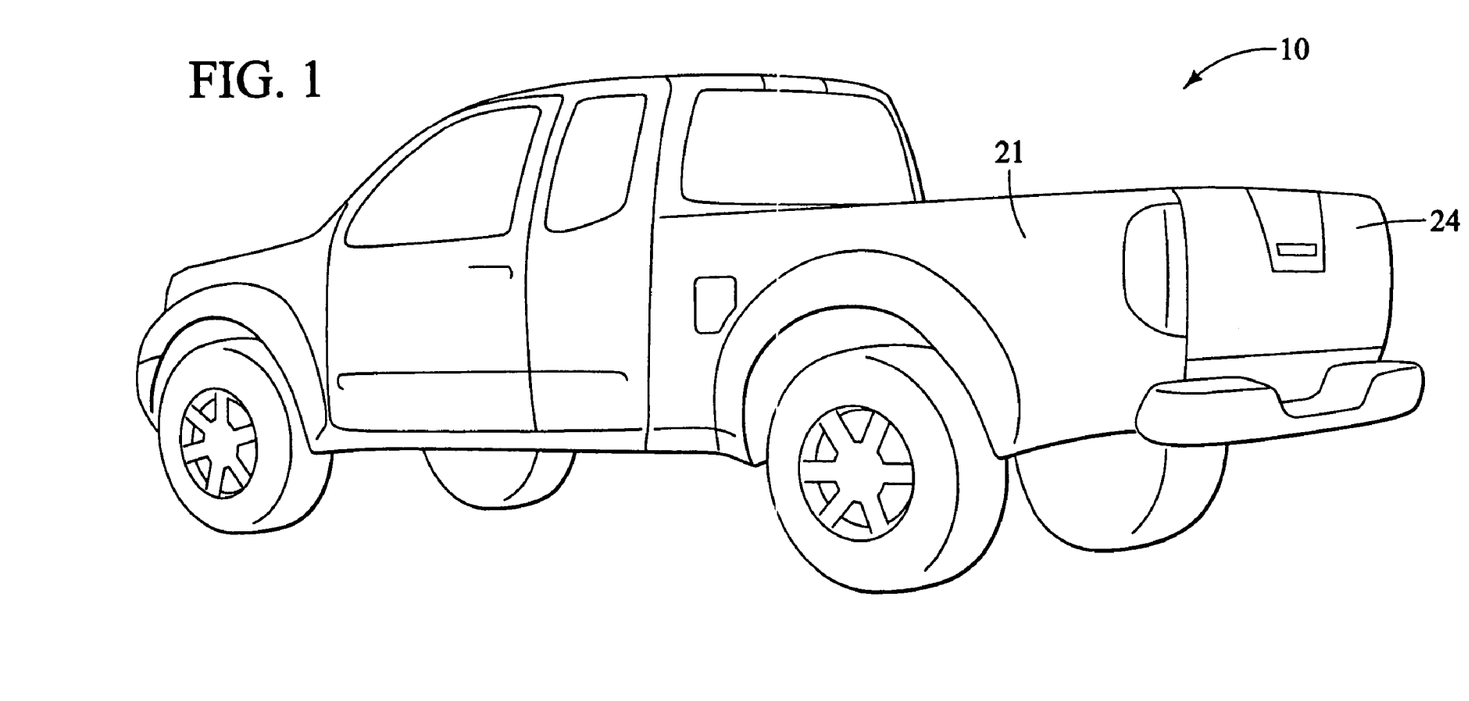
FIG. 1 is a rear side perspective view of a vehicle (pick-up truck) having a sliding bed accessory arrangement in accordance with one embodiment of the present invention.
Figure 2:
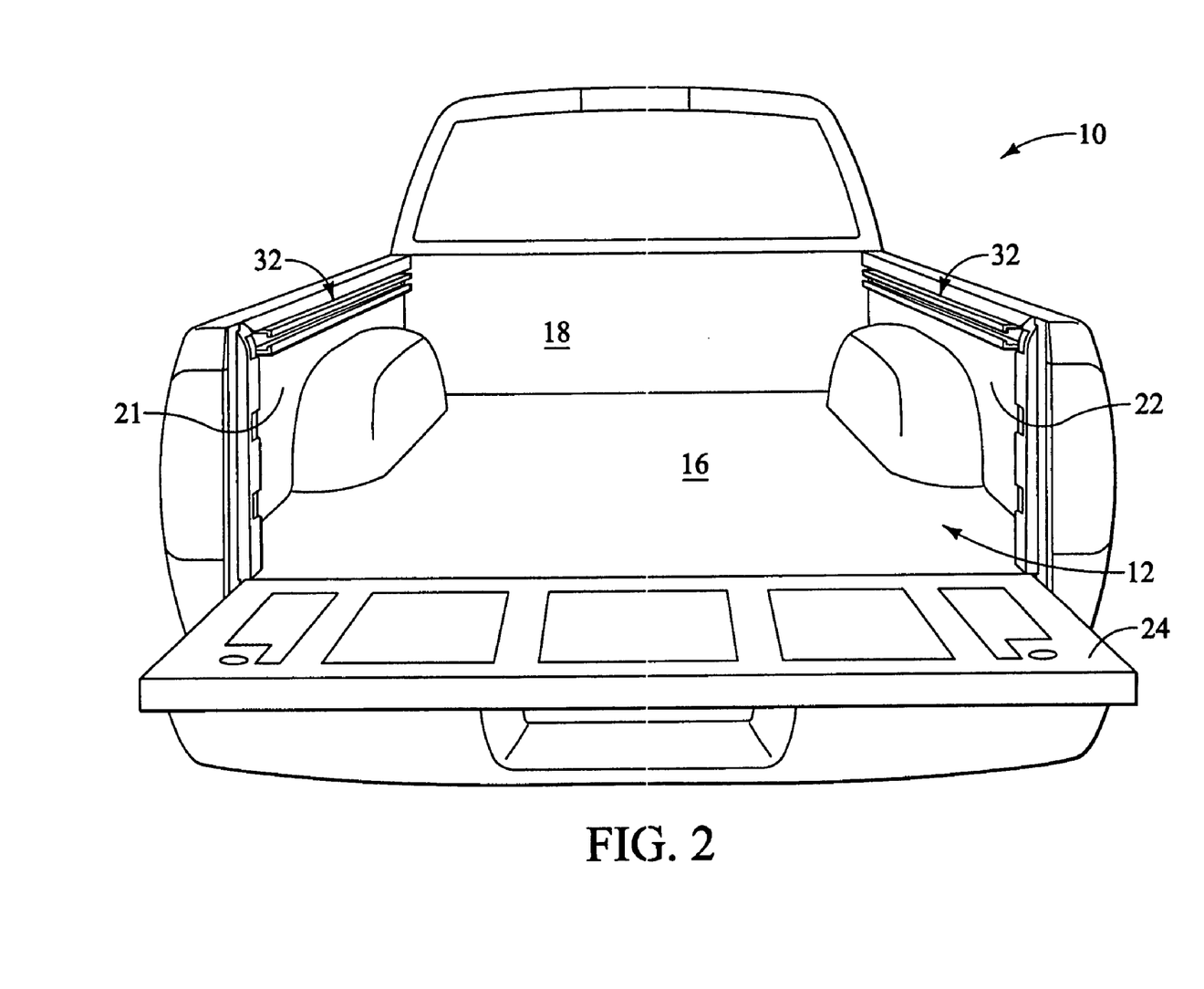
FIG. 2 is a rear elevational view of the vehicle illustrated in FIG. 1 having a pair of roller tracks that are used in the sliding bed accessory arrangement in accordance with the present invention.
Figure 3:
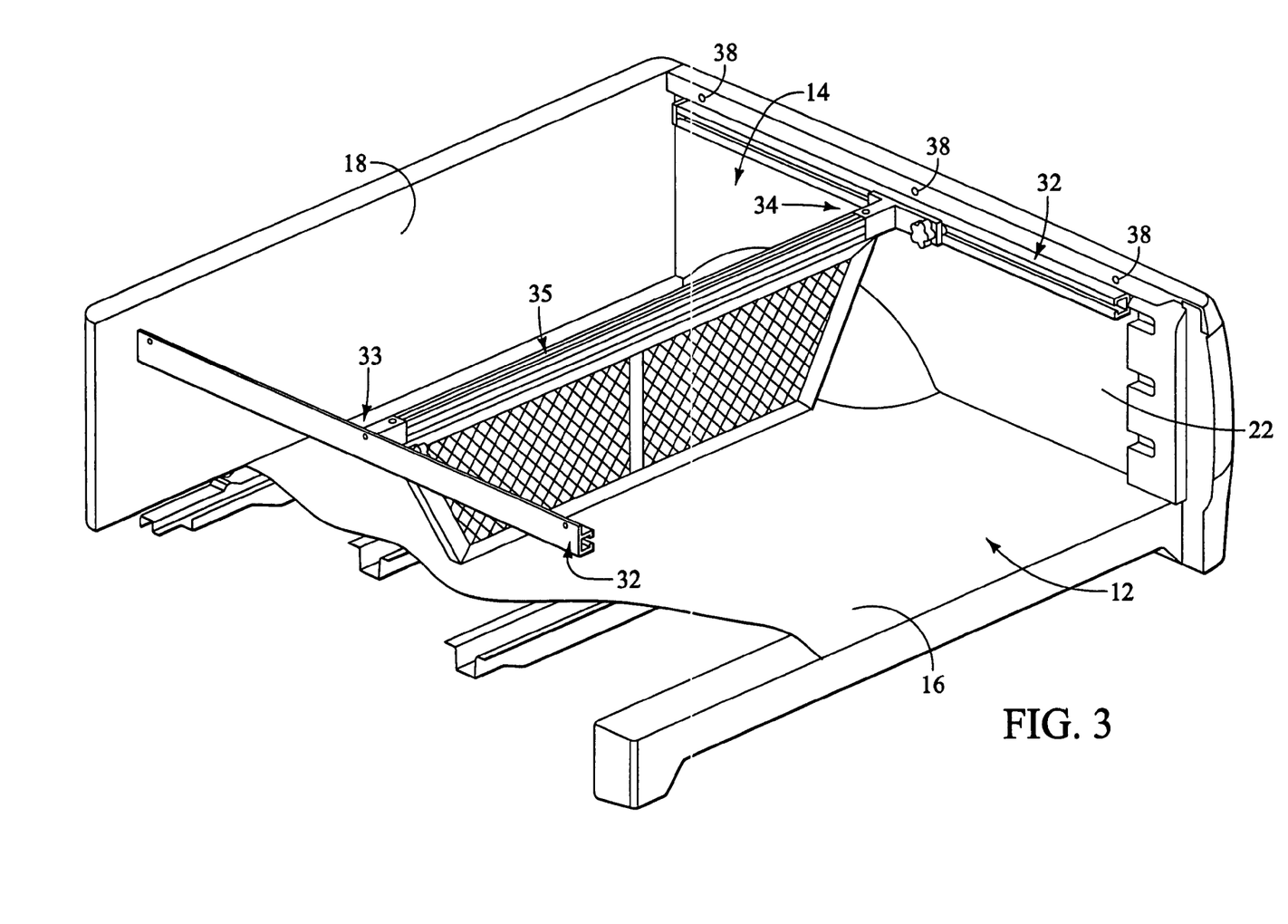
FIG. 3 is a partial top perspective view of a portion of the cargo area with a divider installed in the roller tracks in accordance with the present invention.
Figure 4:
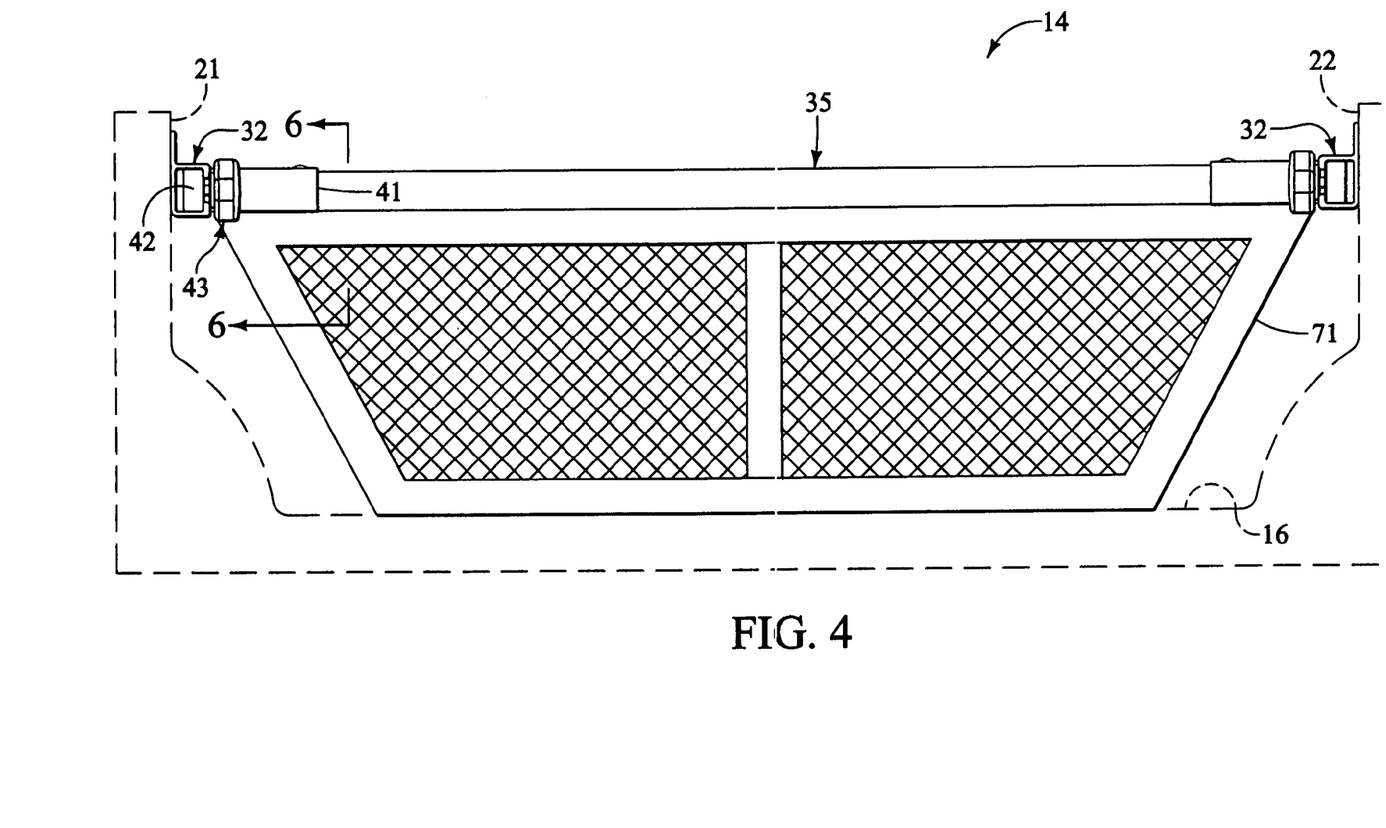
FIG. 4 is a rear elevational view of the sliding bed accessory arrangement disposed in the vehicle bed (shown in phantom lines) in accordance with the present invention.

Once the first and second mounting arrangements 33 and 34 are installed, the second mounting arrangement 34 is the mirror image of the first mounting arrangement 33 as seen in FIG. 4. The first and second mounting arrangements 33 and 34 slideably support the opposite side ends of the sliding divider 35 within the roller tracks 32. As will be explained in further detail below, the first and second mounting arrangements 33 and 34 provide for easily moving the sliding divider 35 along the longitudinal length of the vehicle cargo area 12. Moreover, the first and second mounting arrangements 33 and 34 are configured and arranged to lock the sliding divider 35 in plurality of positions along the longitudinal length of the vehicle cargo area 12.

As seen in FIGS. 6 and 7, the mounting bracket 41 preferably is a substantially T-shaped member that includes a first rigid bracket portion 51 and a second rigid bracket portion 52. The first and second rigid bracket portions 51 and 52 are fixedly coupled together as an integral member. The first rigid bracket portion 51 is preferably a flat metal plate that is configured and arranged to face the roller track 32. In particular, the first rigid bracket portion 51 rotatably supports the rollers 42 via a pair of attachment pins or bolts 53. Accordingly, the mounting bracket 41 is movably supported on the roller track 32 for longitudinal movement along the roller track 32 via the rollers 42. Moreover, the first rigid bracket portion 51 has a vertical open ended slot 54 that extends from its lower edge for receiving a portion of the locking mechanism 43 therein. More specifically, the locking mechanism 43 is retained in the open ended slot 54 by the roller track 32 when the first mounting arrangement 33 is mounted on the roller track 32 as can be seen in FIG. 6.

The sliding member 44 is positioned between the mounting bracket 41 and the rollers 42 to overlie surface of the first rigid bracket portion 51 that faces the roller track 32. The sliding member 44 is preferably made of a material having a low coefficient of friction relative to the metal of the first rigid bracket portion 51 of the mounting bracket 41 so that that the sliding divider 35 moves smoothly among a plurality of positions within the vehicle cargo area 12. For example, the sliding member 44 is constructed as a fiberglass reinforced nylon insert. Basically, the sliding member 44 has a plate shaped portion 44*a* and a pair of projections 44*b* with holes that the pins or bolts 53 pass through. Preferably, the plate shaped portion 44*a* of the sliding member 44 has an overall shape that is generally identical to the overall shape of the first rigid bracket portion 51, but slightly smaller. The projections 44*b* are sized to be received in the slots 36 and maintain the rollers 42 at a predetermined spacing from the plate shaped portion 44*a*.

The second rigid bracket portion 52 is preferably a channel shape member having a generally C-shaped transverse cross section. The second rigid bracket portion 52 is preferably a channel member that is rigidly coupled to the first rigid bracket portion 51 such that the second rigid bracket portion 52 extends substantially perpendicularly to the first rigid bracket portion 51. The second rigid bracket portion 52 has an elongated slot 55 that receives a fastener or mounting bolt 56 for securing a first side end of the sliding divider 35 thereto. The elongated slot 55 is configured and arranged to allow for lateral adjustment of the mounting bracket 41 relative to the sliding divider 35. The second rigid bracket portion 52 constitutes a support section of the mounting bracket 41 that extends inwardly from the first rigid bracket portion 51 such that the side ends of the sliding divider 35 are adjustably coupled to the mounting brackets 41 for lateral adjustment relative to the first and second cargo walls 21 and 22. In the illustrated embodiment, the second rigid bracket portion 52 is preferably mounted midway between the rollers 42 such that the sliding divider 35 is also disposed midway between the rollers 42. Thus, the sliding divider 35 is balanced between the rollers 42 at each end.

As seen in FIGS. 7 and 8, the rollers 42 are preferably constructed of a hard rigid material such that a smoothly roll within the roller tracks 32. As previously mentioned, the rollers 42 are rotatably mounted to the mounting brackets 41 by the pins 53. The rollers 42 can be constructed of any suitable materials such as a hard plastic or a metal roller as need and/or desired. For example, the rollers 42 are preferably sealed rubber wheels that are made of a steel center tube surrounded by a nylon ring that is coated with a hard rubber. Preferably, the rollers 42 are identical.

Figure 5:
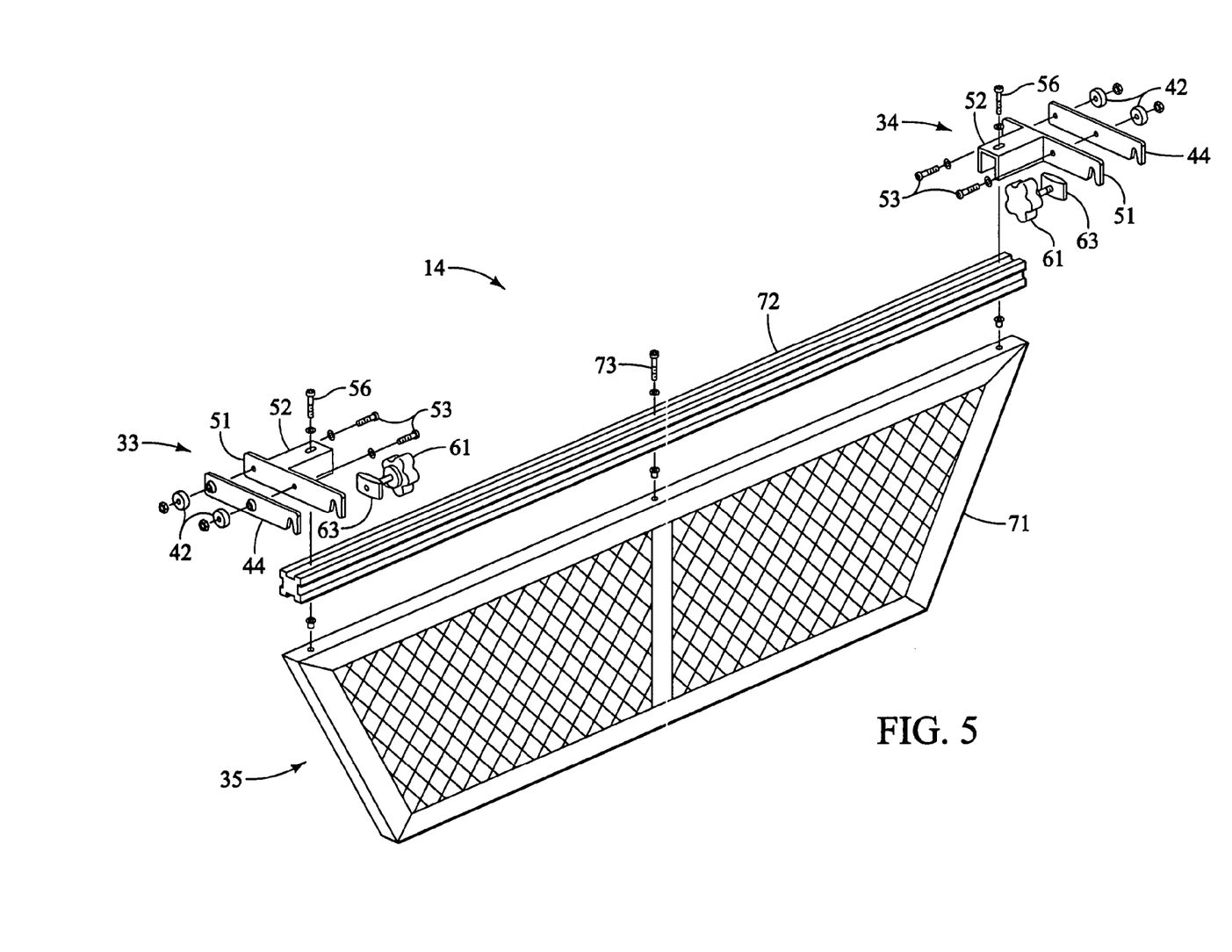
FIG. 5 is an enlarged partial perspective view of one end of the sliding bed accessory arrangement in accordance with the present invention.

Turning now to FIGS. 5, 7 and 8, the locking mechanism 43 preferably includes a knob 61 with a threaded shaft 62 and an anchor plate or locking member 63. The locking member 63 is preferably a rectangularly shaped member that is configured and arranged such that when the locking member 63 is received in the roller track 32, the first locking member 63 will not rotate relative to the roller track 32. The locking member 63 has a threaded bore that threadedly receives the threaded shaft 62 of the knob 61. Thus, the knob 61 constitutes a hand operating member that is rotatable to move the locking member 63 between a sliding or unlocked position and a locked position. More specifically, rotation of the knob 61 causes the threaded shaft 62 to be threaded into or out of the threaded hole of the locking member 63 such that the locking member 63 is moved transversally relative to the roller track 32 in response to the rotation of the knob 61. In the locking position, the locking member 61 is configured and arranged to frictionally engage the interior surfaces of the lips 32*e* of the roller track 32. In the sliding or unlocked position, the knob 61 is rotated such that the locking member 63 is moved transversally away from the retaining lips 32*e* of the roller track 32 such that the first mounting arrangement 33 can move longitudinally along the roller track 32 via the rollers 42.

The sliding divider 35 preferably includes a main grid member 71 and a top bar 72. The main grid member 71 is configured and arranged to substantially divide the vehicle cargo area 12 into front and rear sections. In other words, the main grid member 71 is preferably configured and arranged so as to span substantially completely between the first and second cargo walls 21 and 22 as seen in FIG. 4. In the preferred embodiment, the main grid member 71 has a trapezoid shape. The top bar 72 is fixed mounted to the top end of the main grid member 71 via a center mounting bolt 73 and the mounting bolts 56 (only one shown in FIG. 5) that are used to mount the mounting brackets 41 to the ends of the sliding divider 35.

Figure 12:
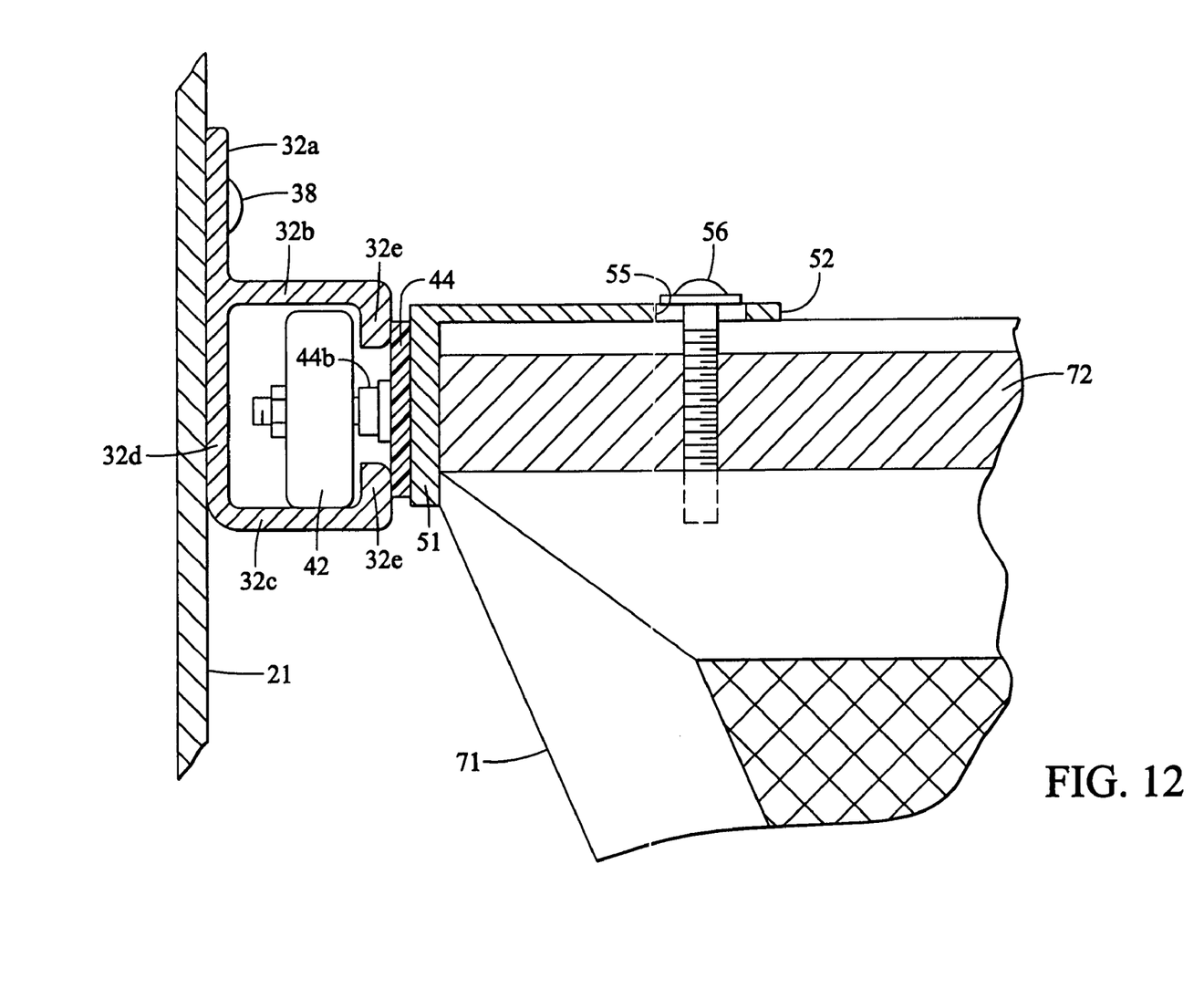
FIG. 12 is a partial perspective view of a portion of the cargo area showing a subsequent installation step from FIG. 11 for installing the mounting arrangements into the roller tracks in accordance with the present invention.

Referring now FIGS. 13–16, installation of the sliding bed accessory arrangement 14 will now be discussed. First, the roller tracks 32 are mounted to the first and second side cargo walls 21 and 22, respectively, as previously seen in FIG. 2. As seen in FIGS. 5, 7 and 12, the next step is to install the top bar 72 to the main grid member 71. The top bar 72 is first coupled to the main grid member 71 via the center one of the mounting bolts 73. The center mounting bolt 73 is preferably not completely tightened. Next, the first and second mounting brackets 41 and 44 are installed onto the opposite side ends of the main grid member 71 via the mounting bolts 56. The mounting bolts 56 should not be completely tightened at this point of time since lateral adjustments of mounting brackets 41 may be needed as will become apparent in the later installation steps.

Now, the divider 35 is placed into the vehicle cargo area 12 by first tilting the divider 35 at an angle to insert one end of the divider 35 into the vehicle cargo area 12 at an angle. Then, the other end is angled and tilted into the vehicle cargo area 12 until the entire divider 35 and the mounting brackets 41 and 44 are located in the vehicle cargo area 12 beneath the roller tracks 32. Once the entire assembly is located in the vehicle cargo area 12, the assembly is rotated until the divider 35 is substantially parallel to the bed floor 16 with the locking mechanisms 43 facing towards the floor 16.

Figure 13:
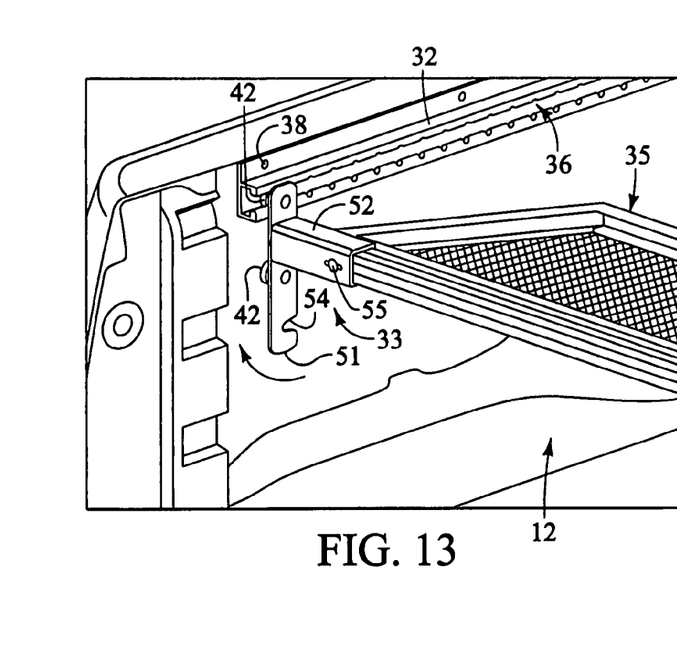
FIGS. 13–16 are a partial perspective views of a portion of the cargo area showing a final installation step for installing the mounting arrangements into the roller tracks in accordance with the present invention.
Figure 14:
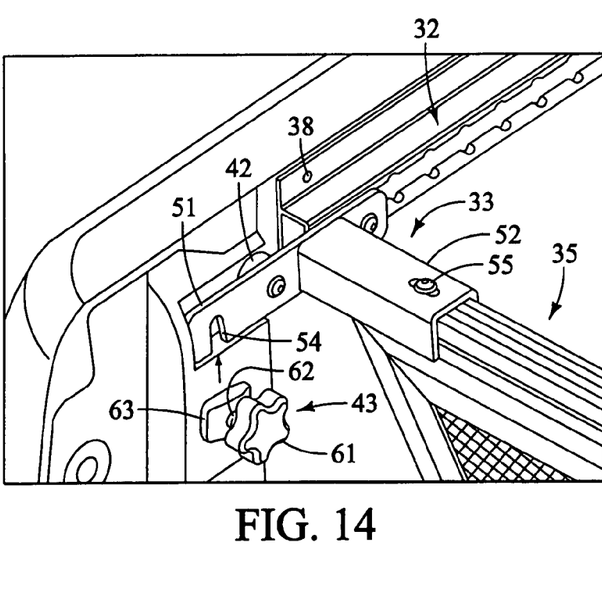
Figure 15:
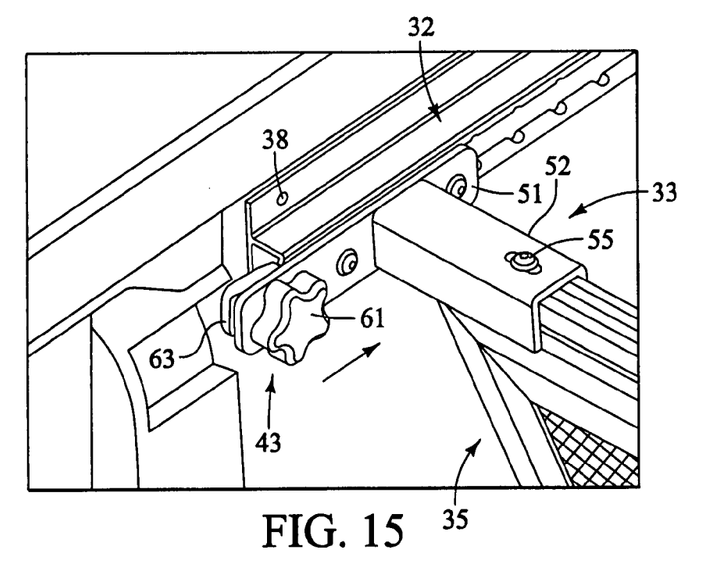
Figure 16:
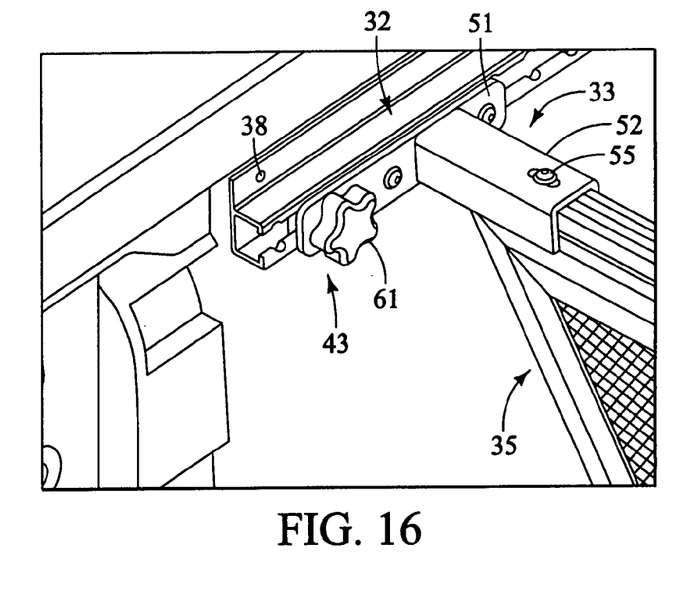

Now, the top rollers 32 that are opposite the locking mechanisms 43 are inserted into the rear open end of the roller tracks 32 as best seen in FIG. 13. To do this, hold the assembly horizontally and place the top rollers 32 into the roller tracks 32 and then start to slide the assembly forward towards the front of the vehicle 10. Then rotate the assembly down to align the other or rear end rollers 42 with the roller tracks 32, as seen in FIG. 14. Once the rear end rollers 42 are located in the roller tracks 32, then the locking mechanisms 43 can be inserted into the open ended slots 54 of the mounting brackets 41. In particular, the shaft portions 62 of the knob 61 are inserted into the open ended slots 54. The knobs 61 are then rotated until the locking members 63 are oriented so as to be able to be inserted into the roller tracks 32. With the first and second mounting arrangements 33 and 34 of the divider 35 partially installed to the rear ends of the roller tracks 32, the first and second mounting arrangements 33 and 34 are moved forwardly within the roller tracks 32 such that the locking members 63 move into the open ends of the roller tracks 32. Thus, the shaft portions 62 of the knob 61 are now retained in the open ended slots 54 by the roller tracks 32.

Now, the lateral alignments of the first and second mounting members 33 and 34 can be adjusted by bolts 56. In particular, for initial adjustment, tighten the knob 61 so that the locking members 63 grip the roller tracks 32 to secure the mounting brackets 41 and 44 to the roller tracks 32, respectively. Then, loosen the knobs 61 and slide the divider 35 back and forth in the tracks to make sure that it slides freely. Now, tighten the bolts 56 so as to lock the relative locations of the first and second mounting arrangements 33 and 34 relative to the divider 35. The center bolt 73 is also then secured. The sliding motion of the divider 35 then should be checked and the lateral adjustment can be readjusted as need and/or desired. Accordingly, now the divider 35 can be moved to the desired location and locked in the place by turning knobs 61. In particular, turning knobs 61 clockwise will tighten the locking members 63 against the roller tracks 32.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sliding bed accessory arrangement comprising:
a first roller track configured to be fixedly attached to a first side cargo wall of a vehicle cargo area;
a second roller track configured to be fixedly attached to a second side cargo wall of the vehicle cargo area in a parallel, spaced arrangement relative to the first roller track;
a first mounting arrangement including a pair of first rolling members rollably disposed in the first roller track and a first locking mechanism having a first locking member slideably disposed in the first roller track and a first operating member operatively coupled to the first locking member to selectively move the first locking member between a first sliding position and a first locked position in which the first locking member applies a compressive force on the first roller track to prevent sliding of the first locking member within the first roller track;
a second mounting arrangement including a pair of second rolling members rollably disposed in the second roller track and a second locking mechanism having a second locking member slideably disposed in the second roller track and a second operating member operatively coupled to the second locking member to selectively move the second locking member between a second sliding position and a second locked position in which the second locking member applies a compressive force on the second roller track to prevent sliding of the second locking member within the first roller track; and
a bed accessory having first and second side ends rigidly attached to the first and second mounting arrangements.

2. A sliding bed accessory arrangement comprising:
a first roller track configured to be fixedly attached to a first side cargo wall of a vehicle cargo area:
a second roller track configured to be fixedly attached to a second side cargo wall of the vehicle cargo area in a parallel, spaced arrangement relative to the first roller track;
a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;
a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and
a bed accessory having first and second side ends rigidly attached to the first and second mounting arrangements, the bed accessory being mounted generally midway between the first rolling members, and generally midway between the second rolling members.

3. The sliding bed accessory arrangement according to claim 1, wherein
the first locking mechanism is located in the first roller track on one side of the first rolling members; and
the second locking mechanism is located in the second roller track on one side of the second rolling members.

4. The sliding bed accessory arrangement according to claim 1, wherein
the first mounting arrangement includes a first rigid bracket portion rotatably supporting the first rolling members; and
the second mounting arrangement includes a second rigid bracket portion rotatably supporting the second rolling members.

5. A sliding bed accessory arrangement comprising:
a first roller track configured to be fixedly attached to a first side cargo wall of a vehicle cargo area;
a second roller track configured to be fixedly attached to a second side cargo wall of the vehicle cargo area in a parallel, spaced arrangement relative to the first roller track;
a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;
a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and
a bed accessory having first and second side ends rigidly attached to the first and second mounting arrangements, the first mounting arrangement including a first rigid bracket portion rotatably supporting the first rolling members and the second mounting arrangement including a second rigid bracket portion rotatably supporting the second rolling members,
the first rigid bracket portion and the first roller track being configured and dimensioned to retain the first locking mechanism on the first rigid bracket portion without using a fastener, and the second rigid bracket portion and the second roller track being configured and dimensioned to retain the second locking mechanism on the second rigid bracket portion without using a fastener.

6. A sliding bed accessory arrangement comprising:
a first roller track configured to be fixedly attached to a first side cargo wall of a vehicle cargo area;
a second roller track configured to be fixedly attached to thae second side cargo wall of the vehicle cargo area in a parallel, spaced arrangement relative to the first roller track:
a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;
a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and
a bed accessory having first and second side ends rigidly attached to the first and second mounting arrangements, the first mounting arrangement including a first rigid bracket portion rotatably supporting the first rolling members, the second mounting arrangement including a second rigid bracket portion rotatably supporting the second rolling members,
the first rigid bracket portion including a first open ended slot that receives a portion of the first locking mechanism such that the first locking mechanism is retained in the first open ended slot by the first roller track when the sliding bed accessory arrangement is installed in the first roller tracks, and
the second rigid bracket portion including a second open ended slot that receives a portion of the second locking mechanism such that the second locking mechanism is retained in the second open ended slot by the second roller track when the sliding bed accessory arrangement is installed in the second roller track.

7. The sliding bed accessory arrangement according to claim 2, wherein
the first open ended slot of the first rigid bracket portion is disposed adjacent a first end of the first rigid bracket portion and the first rolling members are located towards a second end of the first rigid bracket portion; and
the second open ended slot of the second rigid bracket portion is disposed adjacent a first end of the second rigid bracket portion and the second rolling members are located towards a second end of the second rigid bracket portion.

8. A sliding bed accessory arrangement comprising:
a first roller track configured to be fixedly attached to a first side cargo wall of a vehicle cargo area;
a second roller track configured to be fixedly attached to a second side cargo wall of the vehicle cargo area in a parallel, spaced arrangement relative to the first roller track;
a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;
a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and a bed accessory having first and second side ends rigidly attached to the first and second mounting arrangements, the first locking member being shaped relative to the first roller track to prevent rotation of the first locking member about a first threaded shaft section within the first roller tracks, and the second locking member being shaped relative to the second roller track to prevent rotation of the second locking member about the a second threaded shaft section within the second roller track.

9. A sliding bed accessory arrangement comprising:

a first roller track configured to be fixedly attached to a first side cargo wall of a vehicle cargo area;

a second roller track configured to be fixedly attached to a second side cargo wall of the vehicle cargo area in a parallel, spaced arrangement relative to the first roller track;

a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;

a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and a bed accessory having first and second side ends rigidly attached to the first and second mounting arrangements;

the first hand operating member being a first rotatable knob that is rotated to move the first locking member between the first sliding and locked positions, and the second hand operating member being a second rotatable knob that is rotated to move the second locking member between the second sliding and locked positions.

10. The sliding bed accessory according to claim 9, wherein the first rotatable knob has a first threaded shaft that is threadedly coupled to the first locking member to move the first locking member transversely relative to the first roller track upon rotating the first rotatable knob; and the second rotatable knob has a second threaded shaft that is threadedly coupled to the second locking member to move the second locking member transversely relative to the second roller track upon rotating the second rotatable knob.

11. The sliding bed accessory arrangement according to claim 10, wherein the first locking member is configured to frictionally engage the first roller track when moved transversely from the first sliding position to the first locked position; and the second locking member is configured to frictionally engage the second roller track when moved transversely from the second sliding position to the second locked position.

12. A sliding bed accessory arrangement comprising:

a first roller track configured to be fixedly attached to a first side cargo wall of a vehicle cargo area;

a second roller track configured to be fixedly attached to a second side cargo wall of the vehicle cargo area in a parallel, spaced arrangement relative to the first roller track;

a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;

a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and a bed accessory having first and second side ends rigidly attached to the first and second mounting arrangements;

the first locking member being configured to frictionally engage the first roller track when moved transversely from the first sliding position to the first locked positions, and the second locking member being configured to frictionally engage the second roller track when moved transversely from the second sliding position to the second locked position.

13. A sliding bed accessory arrangement comprising:

a first roller track configured to be fixedly attached to a first side cargo wall of a vehicle cargo area;

a second roller track configured to be fixedly attached to a second side cargo wall of the vehicle cargo area in a parallel, spaced arrangement relative to the first roller track;

a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;

a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and a bed accessory having first and second side ends rigidly attached to the first and second mounting arrangements, the first mounting arrangement including a first support section extending therefrom with the first side end of the bed accessory adjustably coupled thereto for lateral adjustment relative to the first and second cargo walls, and the second mounting arrangement including a second support section extending therefrom with the second side end of the bed accessory adjustably coupled thereto for lateral adjustment relative to the first and second cargo walls.

14. The sliding bed accessory arrangement according to claim 1, wherein
the bed accessory is a cargo bed divider that is dimensioned to extend between the first and second cargo walls to divide the vehicle cargo area.

15. The sliding bed accessory arrangement according to claim 1, wherein
the first and second roller tracks have generally transverse C-shaped cross sections that open towards each other.

16. A sliding bed accessory arrangement comprising:
a first roller track configured to be fixedly attached to a first side cargo wall of a vehicle cargo area;
a second roller track configured to be fixedly attached to a second side cargo wall of the vehicle cargo area in a parallel, spaced arrangement relative to the first roller track;
a first mounting arrangement including a pair of first rolling members rollably disposed in the first roller track and a first locking mechanism having a first locking member slideably disposed in the first roller track and a first hand operating member operatively coupled to the first locking member to selectively move the first locking member between a first sliding position and a first locked position in which sliding of the first locking member is prevented;
a second mounting arrangement including a pair of second rolling members rollably disposed in the second roller track and a second locking mechanism having a second locking member slideably disposed in the second roller track and a second hand operating member operatively coupled to the second locking member to selectively move the second locking member between a second sliding position and a second locked position in which sliding of the second locking member is prevented; and
a bed accessory having first and second side ends rigidly attached to the first and second mounting arrangements, the first mounting arrangement including a first non-metallic sliding material with a low coefficient of friction relative to the first roller track with the first non-metallic sliding material being disposed between the first side end of the bed accessory and the first rolling members to contact an exterior surface of the first roller track, and the second mounting arrangement including a second non-metallic sliding material with a low coefficient of friction relative to the second roller track with the second non-metallic sliding material being disposed between the second side end of the bed accessory and the second rolling members to contact an exterior surface of the second roller track.

* * * * *